US011315539B2

(12) United States Patent
Inoue et al.

(10) Patent No.: US 11,315,539 B2
(45) Date of Patent: Apr. 26, 2022

(54) ACTIVE VIBRATION NOISE CONTROL SYSTEM

(71) Applicant: HONDA MOTOR CO., LTD., Tokyo (JP)

(72) Inventors: Toshio Inoue, Wako (JP); So Nakamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 232 days.

(21) Appl. No.: 16/648,918

(22) PCT Filed: Sep. 27, 2017

(86) PCT No.: PCT/JP2017/035061
§ 371 (c)(1),
(2) Date: Mar. 19, 2020

(87) PCT Pub. No.: WO2019/064397
PCT Pub. Date: Apr. 4, 2019

(65) Prior Publication Data

US 2020/0286459 A1 Sep. 10, 2020

(51) Int. Cl.
*G10K 11/178* (2006.01)
*H02P 29/00* (2016.01)

(52) U.S. Cl.
CPC ............ *G10K 11/178* (2013.01); *H02P 29/00* (2013.01); *G10K 2210/129* (2013.01)

(58) Field of Classification Search
CPC . B60L 2270/142; B60R 11/02; G10K 11/178; G10K 11/17815; G10K 11/17854; G10K 11/17883; G10K 2210/1282; G10K 2210/129; H02P 29/00; H02P 6/157; Y02T 10/64

(Continued)

(56) References Cited

FOREIGN PATENT DOCUMENTS

| | | |
|---|---|---|
| JP | H05-80776 A | 4/1993 |
| JP | H07-129184 A | 5/1995 |

(Continued)

OTHER PUBLICATIONS

International Search Report by ISA/JP dated Nov. 7, 2017, on PCT/JP2017/035061, 2 pages.

(Continued)

*Primary Examiner* — Jason R Kurr
*Assistant Examiner* — Friedrich Fahnert
(74) *Attorney, Agent, or Firm* — Rankin, Hill & Clark LLP

(57) ABSTRACT

An active vibration noise control system is applied to a vehicle provided with an EPS motor to change behavior of the vehicle. The active vibration noise control system includes an ANC processor configured to receive acoustic information at a predetermined position in a vehicle compartment as an error signal and control a vibration noise based on a reference signal correlate with the vibration noise and the error signal that is received and an inverse electromotive force information receiving section receiving information on an inverse electromotive force induced on the EPS motor by behavior change of the vehicle. The ANC processor utilizes as a reference signal the information on the inverse electromotive force received by the inverse electromotive force information receiving section. The active vibration noise control system actively controls the vibration noise generated in the vehicle.

6 Claims, 7 Drawing Sheets

(58) Field of Classification Search
USPC .......................................................... 318/460
See application file for complete search history.

(56) References Cited

FOREIGN PATENT DOCUMENTS

| | | | |
|---|---|---|---|
| JP | H07-177613 | A | 7/1995 |
| JP | H07-219561 | A | 8/1995 |
| JP | 2010-111205 | A | 5/2010 |
| JP | 2011-126300 | A | 6/2011 |

OTHER PUBLICATIONS

Written Opinion by ISA/JP dated Nov. 7, 2017, on PCT/JP2017/035061, 4 pages.

ACTIVE VIBRATION NOISE CONTROL SYSTEM

TECHNICAL FIELD

The present invention relates to an active vibration noise control system to actively control vibration noise that a vehicle generates.

BACKGROUND ART

Patent Document 1 describes an invention of an active vibration noise control system to actively control vibrations and noises generated in a vehicle. Describing the invention in detail, the active vibration noise control system in accordance with Patent Document 1 comprises vibration sensors fitted to suspensions on wheels respectively and a microphone for collecting sound fitted at a predetermined position and performs an appropriate signal processing to reduce a road noise and a booming noise by using vibration signals detected by the vibration sensors as reference signals and a residual sound collected by the microphone as an error signal.

The active vibration noise control system of Patent Document 1 enables controlling plural kinds of vibration noises which differ from one another in phase and intensity.

Patent Document 1: JP-H07-219561A

SUMMARY OF THE INVENTION

Problem for the Invention to Solve

However, since the active vibration noise control system of Patent document 1 has a vibration sensor fitted to a suspension on each of the wheels and uses a vibration signal detected by the vibration sensor for each of the wheel as a reference signal, it has a problem with a relatively complicated configuration for obtaining the reference signal.

Means to Solve the Problem

In order to achieve the objective above described, the invention of claim 1 has a main aspect of an active vibration noise control system configured to be applied to a vehicle fitted with an electric motor to be driven to change vehicle behavior and to actively control a vibration noise generated in the vehicle, the active vibration noise control system comprising, an error signal receiving section receiving acoustic information at a predetermined position in the vehicle as an error signal, a vibration noise control section controlling the vibration noise based on a reference signal correlating with the vibration noise and the error signal received by the error signal receiving section and an inverse electromotive force information receiving section receiving information on an inverse electromotive force induced on the electric motor by a behavior change of the vehicle, wherein the vibration noise control section makes use of the information on the inverse electromotive force as the reference signal.

The invention of claim 1 makes use of an electric motor to change a behavior of a vehicle as an electric power generator, utilizes information on an inverse electromotive force induced on the electric motor by the behavior change of the vehicle as a reference signal and enables simplifying a configuration to collect the reference signal.

Effect of the Invention

The active vibration noise control system of the present invention enables obtaining the reference signal with a simpler configuration.

EMBODIMENT FOR PRACTICING THE INVENTION

An active vibration a noise control system 11 of the present invention is described in detail with reference to the drawings. Members having the same function or a corresponding function are given a single reference sign in principle. In addition, a size and a shape of some members are modified or exaggerated for the sake of convenience.

<General Configuration of the Active Vibration Noise Control System 11 of the Present Invention>

To begin with, a general configuration of the vibration noise control system (that is referred to as "ANC system" as well hereinafter) 11 is explained with reference to FIG. 1.

Figure 1:
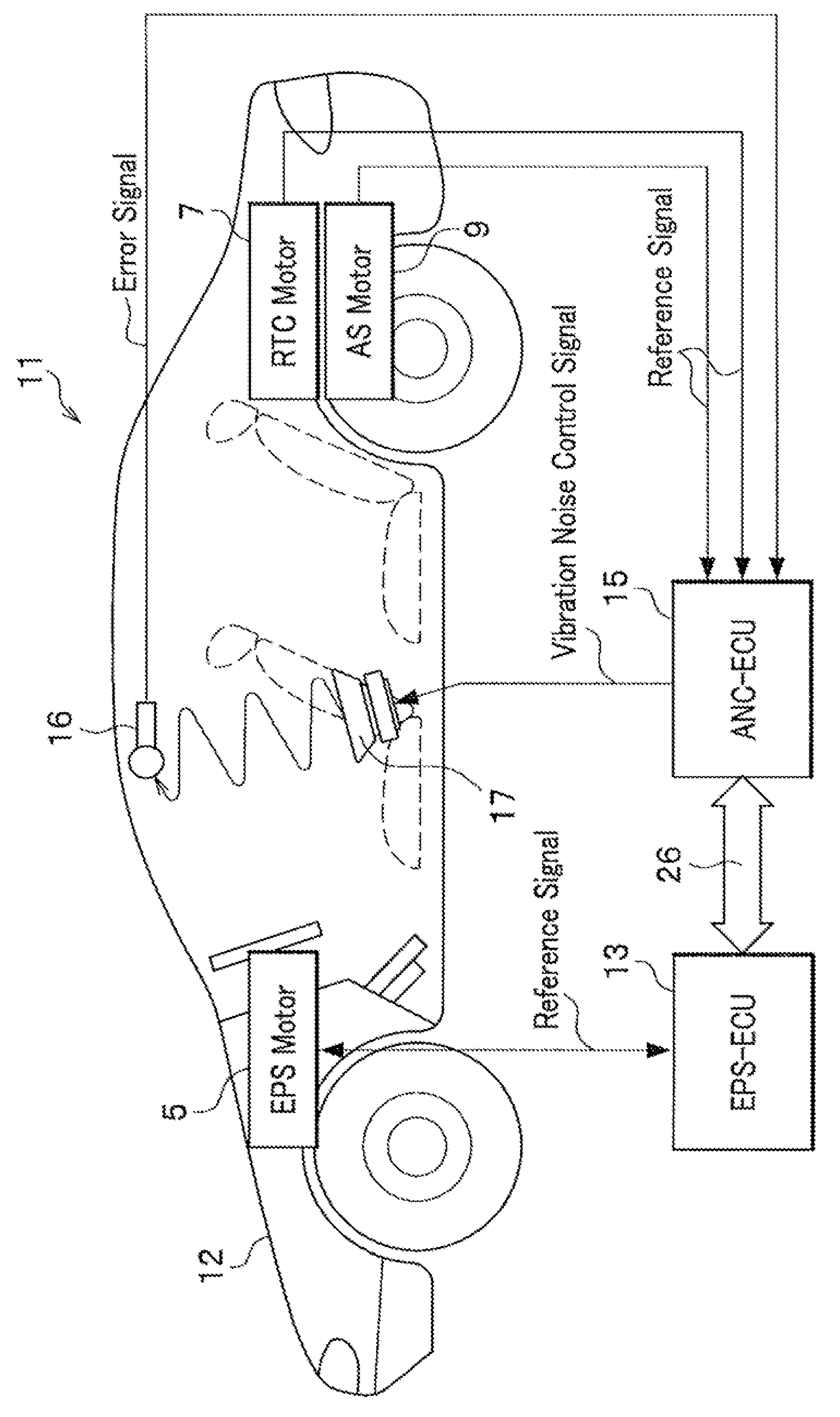
FIG. 1 schematically illustrates a whole configuration of an active vibration noise control system of the present invention.

FIG. 1 is intended to schematically illustrate the whole configuration of the ANC system 11 of the present invention.

The ANC system 11 of the present invention is configured to perform a function to actively control a vibration noise generated in a vehicle body by the vehicle 12 changing its behavior, performing active vibration noise control (to be explained in detail later) by making use of an electric motor to change the behavior of the vehicle 12, such as an EPS (Electrical Power Steering) motor 5, an RTC (Rear Toe Control) motor 7 and an AS (Active Suspension) motor 9, as an electric power generator and utilizing information on an inverse electromotive force to be induced on the EPS motor 5, the RTC motor 7 or the AS motor 9 by the vehicle 12 changing its behavior.

The EPS motor 5 is configured to provide a supplemental force for steering. The RTC motor 7 is configured to provide a supplemental force for changing a toe angle of rear wheels. The AS motor 9 is configured to provide a supplemental force to supplement a damping force on an active suspension (not shown) interposed between a vehicle body and a wheel.

Hereinafter, the ANC system 11 of the present invention is described with an example using the EPS motor 5 as an electric motor.

The ANC system 11 of the present invention as shown in FIG. 1 is applied to a vehicle 12 that is equipped with the EPS motor (electric motor) 5 to change a behavior of the vehicle 12 and is configured to actively control a vibration noise generated in the vehicle body by the vehicle 12 changing its behavior. The ANC system 11 comprises an ANC-ECU 15 performing active vibration noise control (referred to as "ANC control" as well, hereinafter), a microphone 16 connected with the ANC-ECU 15 and an acoustic speaker 17.

The EPS motor 5 is configured to apply to a steering shaft 31 (See FIG. 2, to be explained later) a supplement force to reduce a resistance of a steering wheel (steering counterforce) against which a driver turns the steering wheel. The EPS motor is not limited to a specific motor and may be preferably a brushless DC motor, for example.

An EPS-ECU 13, which performs driving control of the EPS motor 5, is connected with an ANC-ECU 15 through a communication medium 26. The EPS-ECU 13 and the ANC-ECU 15 are described in detail later.

The microphone 16 is configured to receive acoustic information at a predetermined position in a vehicle compartment as an error signal. That is, the microphone 16 is fitted on a roof portion in the vehicle compartment and is configured to receive a sound in the vicinity of an ear of a driver sitting at a driver seat and output the received sound to the ANC-ECU 15. In an acoustic field space in the vehicle compartment, the microphone 16 receives a synthesized sound (residual sound) into which a vibration noise and a cancelling sound emitted from an acoustic speaker 17 to cancel the vibration noise are synthesized.

The acoustic speaker 17 is fitted on a door or the like in the vehicle compartment and is configured to emit in the acoustic space in the vehicle compartment the cancelling sound which the ANC-ECU 15 calculates to cancel the vibration noise.

<Configuration of the Steering Unit 18 Operating in Cooperation with the ANC System 11 of the Present Invention>

Figure 2:
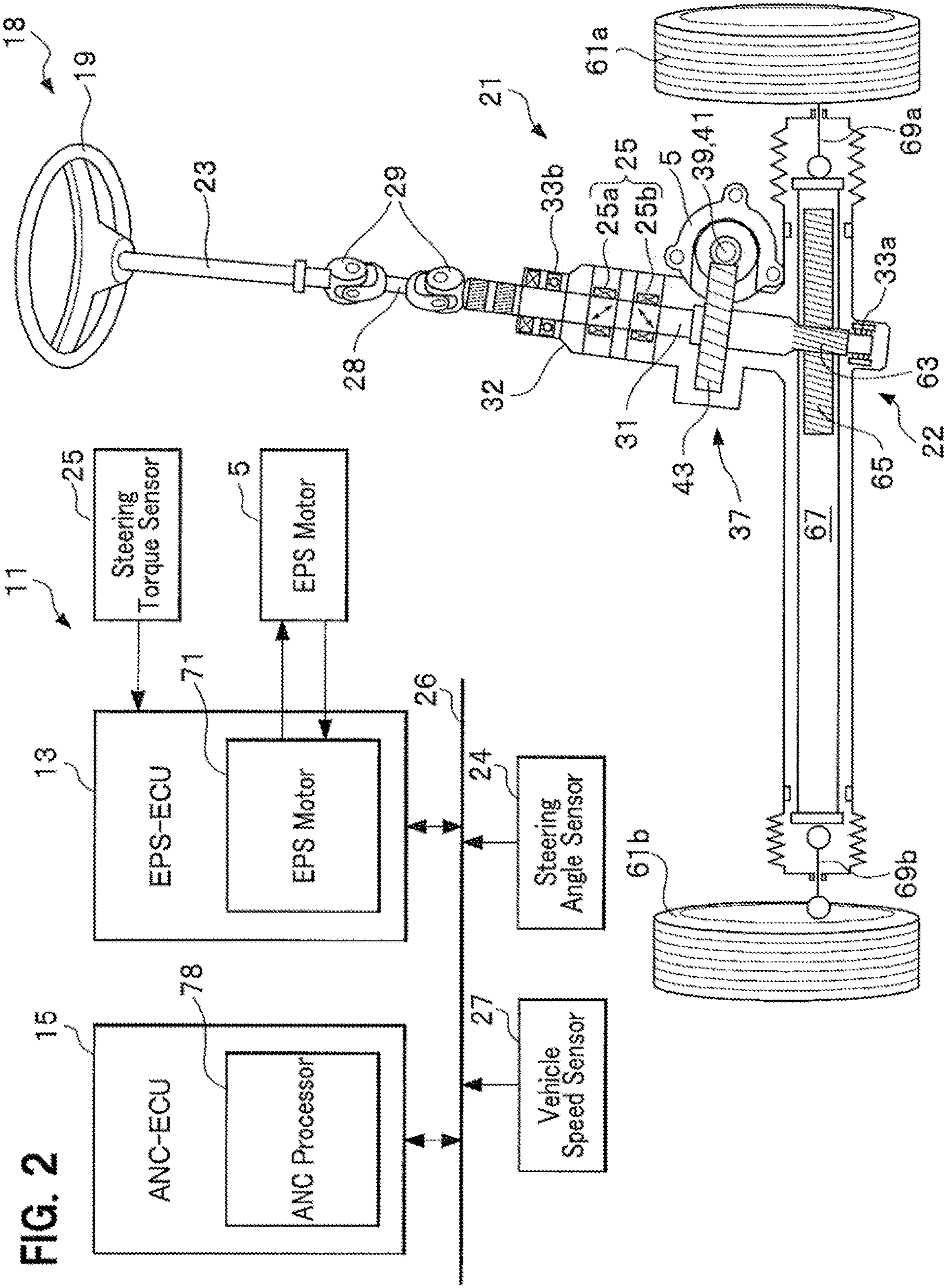
FIG. 2 shows a schematic block diagram of the active vibration noise control system of the present invention together with a steering unit that operates in cooperation with the active vibration noise control system.

A configuration of the steering unit 18 to be operated in cooperation with the ANC system 11 is described with reference to FIG. 2. FIG. 2 shows a schematic block diagram of the ANC system 11 of the present invention together with the steering unit 18 to be operated in cooperation with the ANC system 11.

The steering unit 18 as shown in FIG. 2 is fitted with a steering wheel 19, an auxiliary steering unit 21 and a wheel turning unit 22. The steering wheel 19 is a member which a driver turns when a direction in which the vehicle 12 (See FIG. 1) is going to run is changed to a desired direction. A center portion of the steering wheel 10 is connected with one end portion of the steering shaft 23.

As shown in FIG. 2, the steering shaft 23 is fitted with a steering angle sensor 24 to detect a steering angle. Information on the steering angle detected by a steering angle sensor 24 is sent to the EPS-ECU 13 through the communication medium 26.

The communication medium 26 is connected with a vehicle speed sensor 27 to detect a speed of the vehicle (vehicle speed) as well as the steering sensor 24. Vehicle speed information on the vehicle speed detected by the vehicle speed sensor 27 is sent to the EPS-ECU 13 through the communication medium 26.

The other end portion of the steering shaft 23, which is an opposite end portion to the end portion with which the steering wheel 19 is connected, is connected to a wheel turning shaft 31 through an intermediate shaft 28 and a pair of universal joints 29 connected in series. The wheel turning shaft 31 is supported by bearings 33*a*, 33*b* which are fitted respectively at upper and lower portions in a housing 32 and kept rotatable relative to the housing 32.

There is a steering torque sensor 25 of a magnetostrictive type mounted in the housing 32 to surround the wheel turning shaft 31. The steering torque sensor 25 is configured to detect the steering torque that is input through the steering wheel 19, the steering shaft 23, the intermediate shaft 28 and the pair of universal joints 29 without being contact with the wheel turning shaft 31, using, for example, first and second coils 25*a*, 25*b* that are of a solenoid type. Steering torque information on the steering torque detected by the steering torque sensor 25 is sent to the EPS-ECU 13.

The auxiliary steering unit 21 is fitted with the EPS motor 5 to output a supplemental force for steering and a speed reducing mechanism unit 37.

The speed reducing mechanism unit 37 comprises a worm gear 41 that is connected with an output shaft 39 of the EPS motor 5 and a worm wheel gear 43 that is in mesh with the worm gear 41. The worm wheel gear 43 is secured to an intermediate portion of the wheel turning shaft 31 in its axis direction and is configured to be rotatable along with the wheel turning shaft 31. The speed reducing mechanism unit 37 is interposed between an output shaft 39 of the EPS motor 5 and the wheel turning shaft 31, As a result, the worm wheel gear 43 is configured to perform a function of transmitting a driving force from the EPS motor 5 to the steering wheel 19 through the speed reducing mechanism unit 37, the wheel turning shaft 31 and the steering shaft 23, and simultaneously transmitting the driving force to a pair of wheels 61*a*, 61*b* through the wheel turning unit 22.

The EPS motor 5 is fitted with a resolver (not shown) that detects and outputs rotation angle information on a rotation angle of the EPS motor 5 and is formed integrally with the EPS motor 5. The information on the rotation angle of the EPS motor 5 detected by the resolver is sent to the EPS-ECU 13.

The wheel turning unit 22 performs a function of transmitting a steering force (steering torque) input by a driver through the steering wheel 19 and the steering shaft 23 to the pair of wheels 61*a*, 61*b*. The wheel turning unit 22 includes a pinion gear 63 formed on the wheel turning shaft 31, a rack shaft 67 including rack teeth 65 being in mesh with the pinion gear 63 and being capable of moving back and forth in the vehicle width direction, a pair of tie rods 69*a*, 69*b* fitted on both ends of the rack shaft 67 and the pair of wheels 61*a*, 61*b* rotatably fitted through the pair of tie rods 69*a*, 69*b*.

<Configurations of EPS-ECU 13 and ANC-ECU 15 Inclusive of their Peripherals>

Figure 3A:
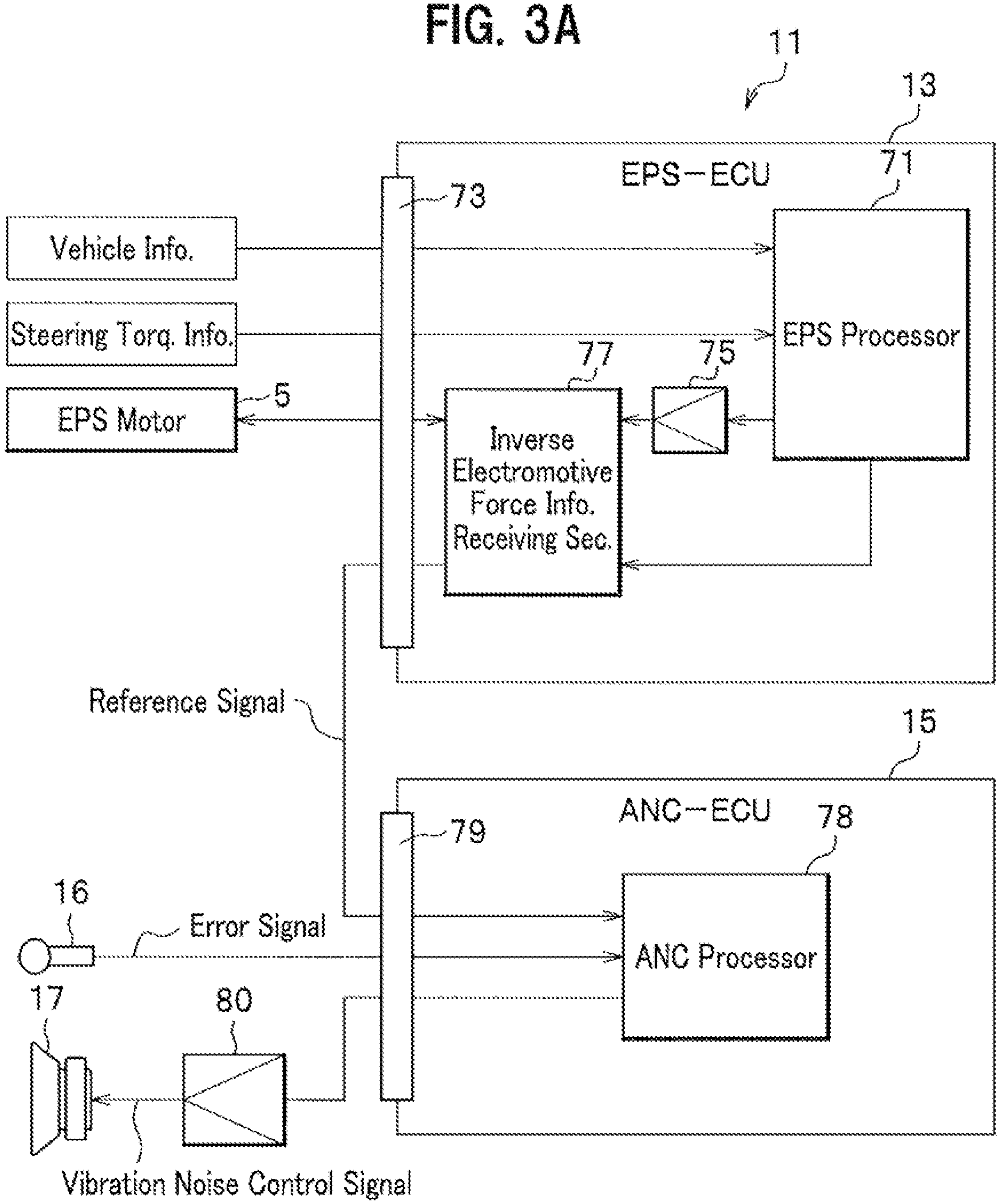
FIG. 3A shows a block diagram indicating connection between EPS-ECU and ANC-ECU which are included in the active vibration noise control system of the present invention.

Next, a configuration of the EPS-ECU 13 and the ANC-ECU 15 inclusive of their peripherals are described with reference to FIG. 3A. FIG. 3A is a block diagram showing connections between the EPS-ECU 13 and the ANC-ECU 15 that constitute the ANC system 11 of the present invention.

As shown in FIG. 3A, the EPS-ECU 13 is configured to check various pieces of information such as steering angle information detected by the steering angle sensor 24 and vehicle information inclusive of the vehicle speed information detected by the vehicle speed sensor 27, the steering torque information continually detected by the steering torque sensor 25 and the rotation angle information on the EPS motor 5 detected by the resolver, calculate a target current to be input to the EPS motor 5 and perform control to have an actual current passing through the EPS motor 5 equal to the target current. Thus, the steering force a driver needs to apply to the steering wheel 19 is decreased.

In addition, the EPS-ECU 13 is configured to receive information on an inverse electromotive force induced on the EPS motor 5 by the vehicle 12 changing its behavior and send the received information on the inverse electromotive force to the ANC-ECU 15. The behavior change of the vehicle 12 as referred to in this example is, for example, a case in which the wheels 61*a*, 61*b* of the vehicle 12 running straight come in contact with an irregular surface of ground such as a step on a road, an uneven surface of a road, a joined portion of road surfaces or a recessed portion on a road etc. When this case occurs, an irregular turn of the wheels 61*a*, 61*b* coming in contact with the irregular surface of ground is transmitted to an output shaft 39 of the EPS motor 5 as the behavior change of the vehicle 12 through the rack shaft 67, the pinion gear 63, the wheel turning shaft 31, the worm wheel gear 43 and the worm gear 41.

The EPS motor 5, which is, for example, a brushless motor, comprises a permanent-magnet rotor and stator coils which are fitted thereinside. The EPS motor 5 generates a driving force for rotation through interaction between a magnetic field induced by having a current passing through the stator coils and a magnetic field induced by the permanent-magnetic rotor. Due to this configuration, when the permanent-magnetic rotor is made to rotate by an external force, an electric power that is commensurate with a rotation speed of the rotor is induced. This electric power is referred to as an inverse electromotive force by this invention.

To be more specific, when an external rotation force generated by a behavior change of the vehicle 12 is applied to an output shaft 39 of the EPS motor 5 and the output shaft 39 is made to rotate irregularly, an inverse electromotive force that is commensurate with a rotation speed of the output shaft 39 is induced on the EPS motor 5. That is, since the EPS motor 5 generates the inverse electromotive force that is commensurate with the rotation force (external force) applied by the behavior change of the vehicle 12, the EPS motor 5 functions as a sensor (electric power generator) to detect the behavior change of the vehicle 12.

In order to carry out the control operation as described, the EPS-ECU 13 as shown in FIG. 3A comprises an EPS processor 71 performing various arithmetic operations inclusive of the driving control of the EPS motor 5, an input-output port 73 through which input and output operations of various signals are performed, an amplification circuit 75 amplifying EPS motor control signals generated by the EPS processor 71 to appropriate levels and an inverse electromotive force information receiving section 77 receiving information on the inverse electromotive force induced on the EPS motor 5.

The EPS processor 71 is constituted by a microcomputer including a CPU (Central Processing Unit), a ROM (Read Only Memory) and a RAM (Random Access Memory). The EPS processor 71 is configured to load and execute a program stored in the ROM and perform various functions including an electrical power steering control function and an inverse electromotive force information receiving function.

The EPS processor 71 is configured to function to receive information on a target operation amount (target current value) to the EPS motor 5 and an actual operation amount (actual current value) of the EPS motor 5. The EPS processor 71 corresponds to an "operation amount information receiving section" of the present invention. The information on the target operation amount to the EPS motor 5 and the actual operation amount of the EPS motor 5 received by EPS processor 71 is sent to the inverse electromotive force information receiving section 77.

The inverse electromotive force information receiving section 77 may be configured to calculate a difference between the target operation amount to the EPS motor 5 and the actual operation amount of the EPS motor 5 which are received by the EPS processor 71 ((Target operation amount)−(Actual operation amount)) and receive the calculated difference as information for the inverse electromotive force induced on the EPS motor 5. If this configuration is adopted, an effect of simplifying a configuration to obtain a reference signal is obtained without blocking the auxiliary steering operation by the EPS motor 5.

Figure 4A:
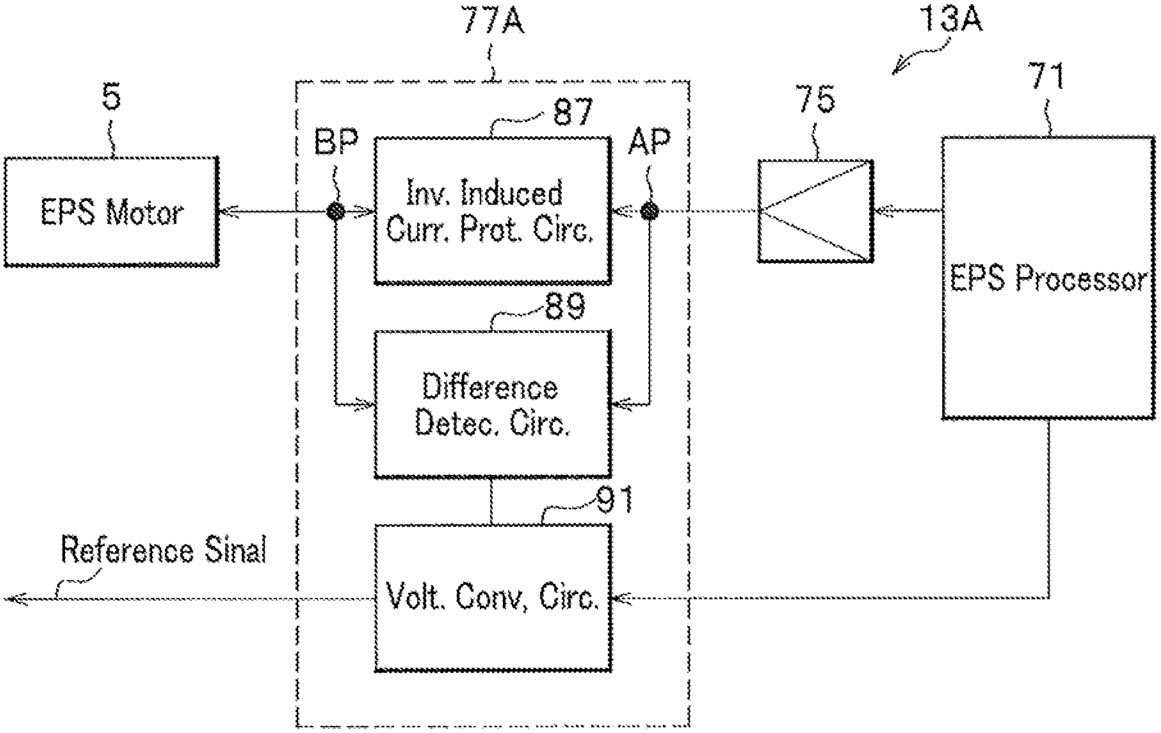
FIG. 4A is a schematic block diagram showing an internal configuration of a first inverse electromotive force information receiving section to receive information on an inverse electromotive force induced on an EPS motor.
Figure 5A:
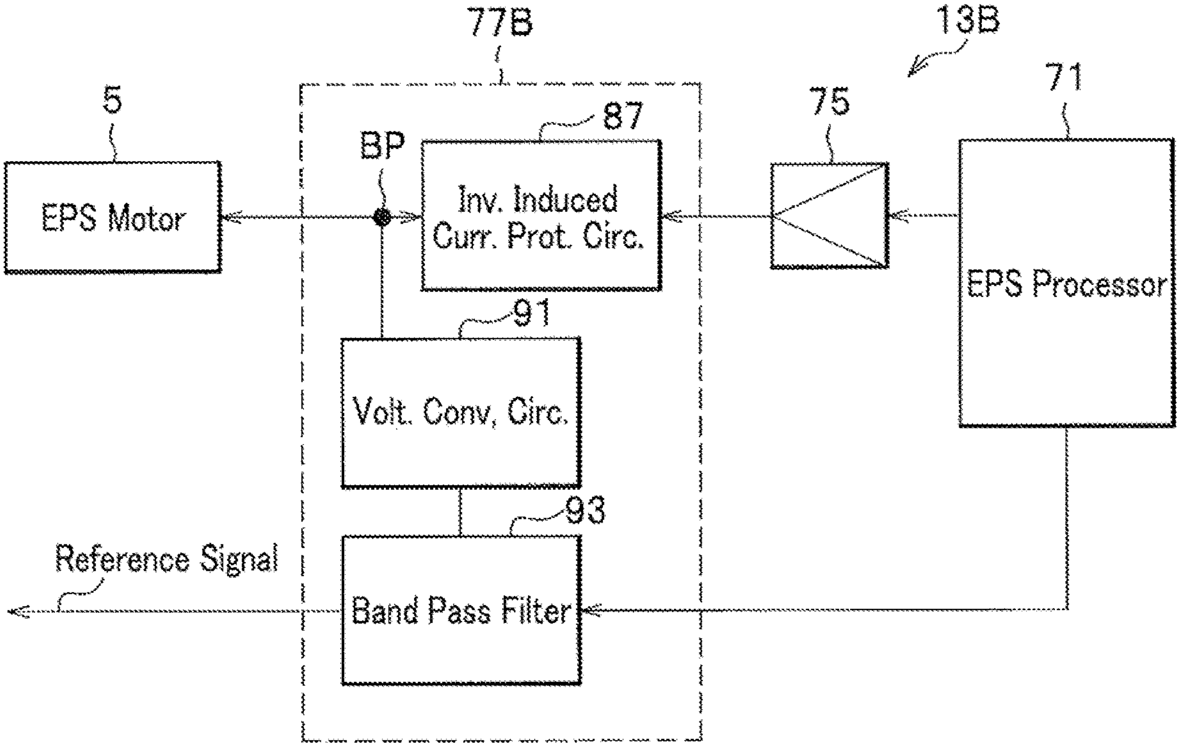
FIG. 5A is a schematic block diagram showing an internal configuration of a second inverse electromotive force information receiving section to receive information on an inverse electromotive force induced on an EPS motor.

The inverse electromotive force information receiving section 77 may be constituted by a first inverse electromotive force information receiving section 77A and a second inverse electromotive force information receiving section 77B (See FIG. 4A and FIG. 5A). Hereinafter, a first EPS-ECU inclusive of the first inverse electromotive force information receiving section 77A is given a sign "13A" while a second EPS-ECU inclusive of the second inverse electromotive force information receiving section 77B is given a sign "13B". Configurations of the first inverse electromotive force information receiving section 77A and the second inverse electromotive force information receiving section 77B are described in detail later.

On the other hand, the ANC-ECU 15 as shown in FIG. 3A is configured to utilize a residual sound collected by the microphone 16 attached in the vehicle compartment as an error signal, use as a reference signal the information sent from the EPS-ECU 13 on the inverse electromotive force induced on the EPS motor 5 (indicating how large the behavior change of the vehicle 12 is), generate a vibration noise control signal to cancel frequency components of the error signal which correlate well with frequency components of the reference signal and make the acoustic speaker 17 emit a sound in accordance with the vibration noise control signal that is generated. In this way, an adaptive signal operation to reduce a road noise and a booming noise is performed, utilizing acoustic interference.

In order to carry out the adaptive signal operation, the ANC-ECU 15 as shown in FIG. 3A comprises an ANC processor 78 performing various arithmetic operations and an input-output port 79 for various signals. The microphone 16 is connected with the input-output port 79 and the acoustic speaker 17 is connected with the input-output port 79 through an amplification circuit 80 to amplify signals.

<Internal Configuration of ANC Processor 78>

Figure 3B:
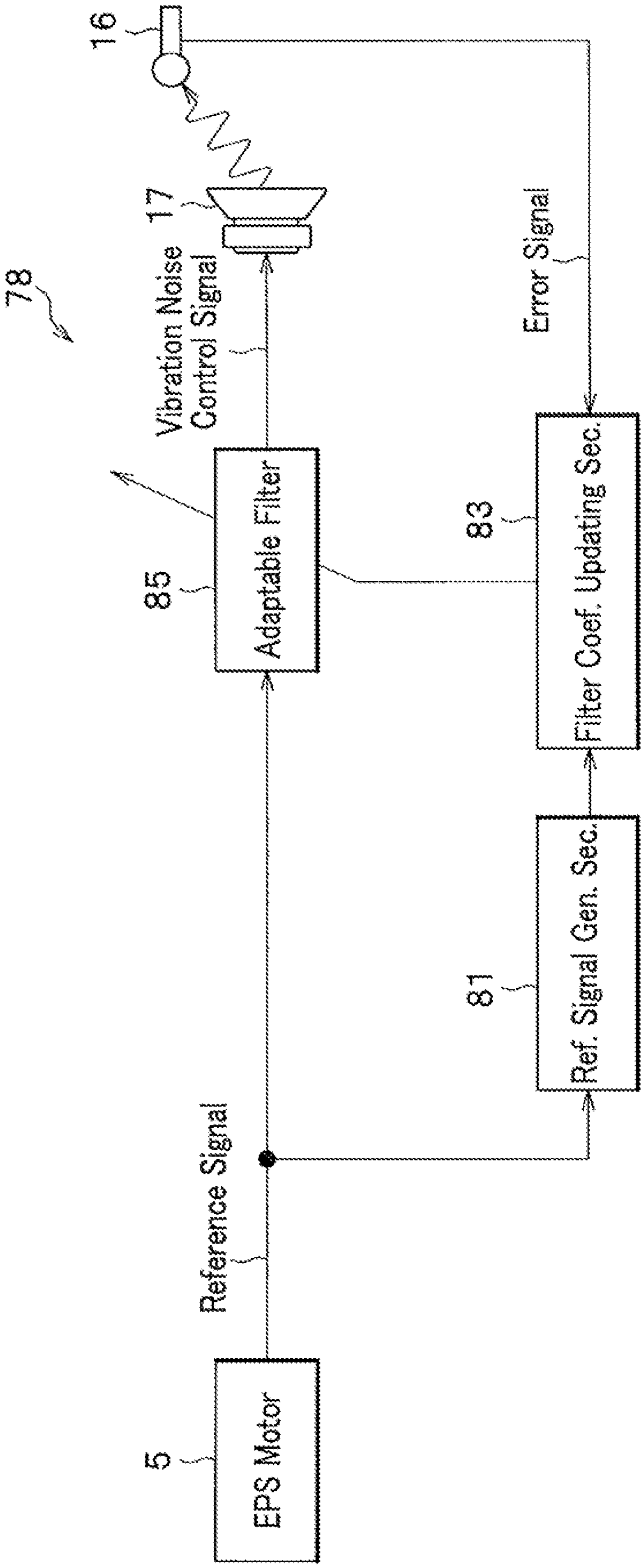
FIG. 3B shows a schematic block diagram of an internal configuration of an ANC processor that ANC-ECU comprises.

Next, an internal configuration of the ANC processor 78 is described with reference to FIG. 3B. FIG. 3B is a block diagram schematically showing an internal configuration of the ANC processor 78 mounted in the ANC-ECU 15. The ANC processor 78 is constituted by a microcomputer including a CPU (Central Processing Unit), ROM (Read Only Memory), RAM (Random Access Memory). The ANC processor 78 is configured to load and execute a program stored in the ROM and perform various functions including an adaptive vibration noise control function.

To be more specific, the ANC processor 78 as shown in FIG. 3B comprises a reference signal generating section 81, a filter coefficient updating section 83 and an adaptable filter 85. The ANC processor 78 corresponds to an "error signal receiving section" and a "vibration noise control section" of the present invention.

The reference signal generating section 81 is configured to generate a reference signal that correlates with the vibration noise based on the information (voltage signal) on the inverse electromotive force induced on the EPS motor 5 and so on. The "reference signal that correlate with the vibration noise" includes a signal corresponding to the vibration noise and such a signal as has a phase and an amplitude which are similar to the signal corresponding to the vibration noise. The reference signal is to be checked by the filter coefficient updating section 83 when a filter coefficient is calculated. 参照信号生成部81は，ＥＰＳモータ５に生じる逆起電力の情報（電圧信号）などに基づいて、振動騒音に相関する参照信号を生成する。ここで、「振動騒音に相関する」信号とは、振動騒音そのものの信号、振動騒音の信号に位相及び振幅が類似した信号を含む。参照信号は、フィルタ係数更新部83において、フィルタ係数を演算する際に参照される。

The filter coefficient updating section 83 is configured to check the reference signal generated by the reference signal generating section 81 and calculate a filter coefficient for each reference signal to reduce the error signal to a minimum to update the filter coefficient to the calculated one.

The adaptable filter 85 is configured to perform an adaptive filter process on the information (voltage signal) on the inverse electromotive force induced on the EPS motor 5 to output a vibration noise control signal.

Specific configurations of the reference signal generating section 81, the filter coefficient updating section 83 and the adaptable filter 85 are described, for example, in JP2010-111205A by the applicant of this application.

<Internal Configuration of First EPS-ECU 13A>

Figure 4B:
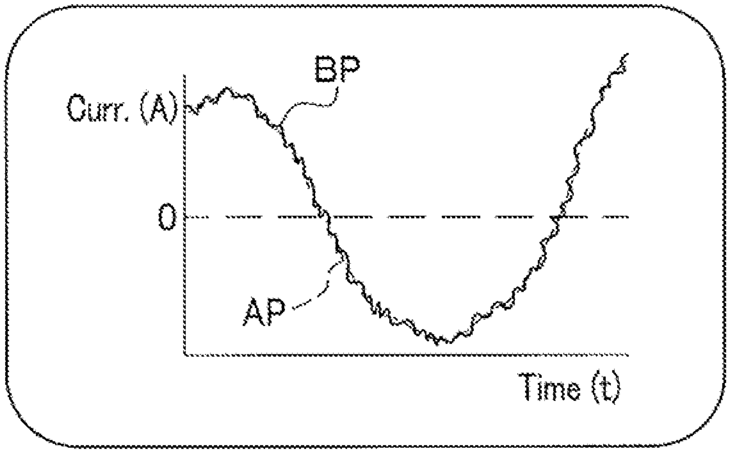
FIG. 4B is a characteristic line graph indicating a change over time of a differential current detected by a difference detection circuit of the first inverse electromotive force receiving section.
Figure 4C:
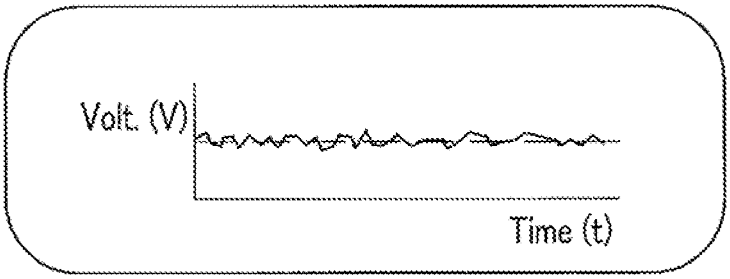
FIG. 4C is a characteristic line graph indicating a change over time of a voltage commensurate with a differential current and output by a voltage conversion circuit of the first inverse electromotive force receiving section.

Next, an internal configuration of the first EPS-ECU 13A is described with reference to FIG. 4A to FIG. 4C, taking into consideration the internal configuration of the first inverse electromotive force information receiving section 77A to receive the information on the inverse electromotive force induced on the EPS motor 5. FIG. 4A is a block diagram schematically showing an internal configuration of the first inverse electromotive force information receiving section 77A. FIG. 4B is a characteristic line graph indicating a change over time of a differential current detected by a difference detection circuit 89 of the first inverse electromotive force receiving section 77A. FIG. 4C is a characteristic line figure indicating a change over time of a voltage corresponding to a differential current and output by a voltage conversion circuit 91 of the first inverse electromotive force receiving section 77A.

The EPS-ECU 13A as shown in FIG. 4A comprises an EPS processor 71, an amplification circuit 75 and the first inverse electromotive force receiving section 77A.

The EPS processor 71 and the amplification circuit 75 have the same configurations as those of the EPS-ECU 13.

The first inverse electromotive force information receiving section 77A includes an inversely induced current protection circuit 87, a difference detection circuit 89 and a voltage conversion circuit 91, as shown in FIG. 4A.

The inversely induced current protection circuit 87 performs a function of preventing the inversely induced current induced to pass through the EPS motor 5 from passing through and damaging the EPS processor 71 and so on. The inversely induced current protection circuit 87 includes electrical components such as capacitors and diodes.

The difference detection circuit 89 is configured to detect currents at each of an input point BP and an output point AP in the inversely induced current protection circuit 87 and output a difference between these detected current values as an inversely induced current value. The current value at the input point BP as indicated in FIG. 4B is a summation of a driving current value and an inversely induced current value of the EPS motor 5. On the other hand, the current value at the output point AP as indicated in FIG. 4B is the driving current value of the EPS motor 5. As a result, it should be understood that a difference between a current value at the input point BP and a current value at the output point AP corresponds to an inversely induced current value according to an equation of (Summation of driving current value and inversely induced current value of EPS motor 5)−(Driving current value of EPS motor 5).

A signal of the inversely induced current is what the EPS motor 5 as an electric power generator detects as corresponding to an irregular turn of the wheels 61*a*, 61*b* (behavior change of the vehicle 12) coming in contact with an irregular surface of ground such as a step on a road, an uneven surface of a road, a joined portion of road surfaces or a recessed portion on a road etc. In short, the signal of the inversely induced current value corresponds to a road noise correlating signal.

The voltage conversion circuit 91 is configured to convert the difference (equal to inversely induced current value) between the current values detected at the input point BP and the output point AP by the difference detection circuit 89 to a voltage value (See FIG. 4C) and output the voltage value. A voltage signal (road noise correlating signal), which corresponds to the inversely induced current value and the voltage conversion circuit 91 outputs after the conversion, is sent to the ANC-ECU 15 as the reference signal.

The first inverse electromotive force information receiving section 77A is able to receive the voltage signal (road noise correlating signal) corresponding to the inversely induced current value, when the EPS motor 5 is out of operation as well as when the EPS motor 5 is in operation.

<Internal Configuration of Second EPS-ECU 13B>

Figure 5B:
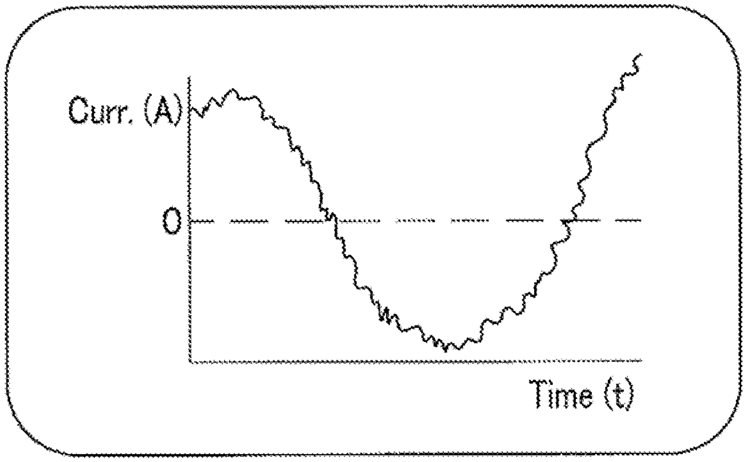
FIG. 5B is a characteristic line graph indicating a change over time of the second inversely induced current input to an inversely induced current protection circuit of the second inverse electromotive force information receiving section.
Figure 5C:
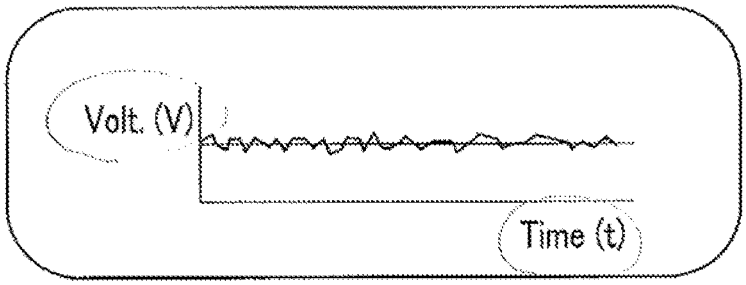
FIG. 5C is a characteristic line graph indicating a change over time of a voltage that corresponds to an inversely induced current and is output by a voltage conversion circuit of the second inverse electromotive force information receiving section.

Next, an internal configuration of the second EPS-ECU 13B is described with reference to FIG. 5A to FIG. 5C, taking into consideration the internal configuration of the second inverse electromotive force information receiving section 77B to receive the information on the inverse electromotive force induced on the EPS motor 5. FIG. 5A is a block diagram schematically showing an internal configuration of the inverse electromotive force information receiving section 77B. FIG. 5B is a characteristic graph indicating a change over time of the second inversely induced current input to the inversely induced current protection circuit 87 of the second inverse electromotive force information receiving section 77B. FIG. 5C is a characteristic line graph indicating a change over time of a voltage that corresponds to the inversely induced current and is output by the voltage conversion circuit 91 of the second inverse electromotive force information receiving section 77B.

The second EPS-ECU 13B as shown in FIG. 5A comprises an EPS processor 71, an amplification circuit 75 and the second inverse electromotive force information receiving section 77B.

The EPS processor 71 and the amplification circuit 75 have the same configurations as those of the EPS-ECU 13.

As shown in FIG. 5A, the second inverse electromotive force information receiving section 77B includes an inversely induced current protection circuit 87, a voltage conversion circuit 91 and a band-pass filter 93.

The inversely induced current protection circuit 87 performs a function of preventing the inversely induced current induced to pass through the EPS motor 5 from passing through and damaging the EPS processor 71 and so on in the same way as the inversely induced current protection circuit 87 in the first inverse electromotive force information receiving section 77A. The inversely induced current protection circuit 87 includes electrical components such as capacitors and diodes.

The voltage conversion circuit 91 is configured to detect a current value at the input point BP in the inversely induced current protection circuit 87 and convert the detected current value (See FIG. 5B) to a voltage value and output the voltage value. The current value at the input point BP corresponds to a summation of the driving current value of the EPS motor 5 and the inversely induced current value of the EPS motor 5.

The current value at the input point BP is converted by the voltage conversion circuit 91 to the voltage value that corresponds to the current value at the input point BP and is output to the band-pass filter 93.

The band-pass filter 93 is configured to filter the voltage signal corresponding to the current value (a summation value of the driving current value and the inversely induced current value of the EPS motor 5) at the input point BP and have the voltage signal only in a predetermined frequency band range pass through. A frequency (a few Hz) of the driving current signal of the EPS motor 5 is significantly lower than frequencies (20 to 500 Hz) of a signal (road noise correlating signal) of the inversely induced current.

Therefore, the predetermined frequency range is set to a frequency range (20 to 500 Hz) of the road noise correlating signal.

As a result, the band-pass filter 93 outputs the voltage signal (road noise correlate signal, see FIG. 5C) for the inversely induced current when the voltage signal for the current value (summation of driving current value and inversely induced current value of EPS motor 5) at the input point BP is input to the band-pass filter 93. The road noise correlating signal, which is output from the band-pass filter 93, is sent to the ANC-ECU 15 as the reference signal.

As is the case with the first inverse electromotive force information receiving section 77A, the second inverse electromotive force information receiving section 77B is able to receive the voltage signal (road noise correlating signal) corresponding to the inversely induced current value, when the EPS motor 5 is out of operation as well as when the EPS motor 5 is in operation.

<Action and Effect of Active Vibration Noise Control System 11 of the Present Invention>

Next, actions and effects of the active vibration noise control system 11 of the present invention are explained.

The active vibration noise control system 11 based on the first aspect of the present invention is applied to the vehicle 12 comprising the EPS motor 5 (electric motor) that is configured to change a behavior of the vehicle 12 and functions to actively control a vibration noise generated in the vehicle 12. This active vibration noise control system 11 comprises the ANC processor (error signal receiving section) 78 receiving acoustic information at a predetermined position in the vehicle 12 as error information, the ANC processor (vibration noise control section) 78 controlling the vibration noise based on the reference signal that correlates with the vibration noise and the error signal received by the ANC processor 78, and the inverse electromotive force information receiving section 77 receiving information on the inverse electromotive force induced on the EPS motor 5 due to a behavior change of the vehicle 12, and the ANC processor 78 utilizes the information on the inverse electromotive force received by the inverse electromotive force information receiving section 77 as the reference signal.

The active vibration noise control system 11 is intended to reduce especially a road noise of the vibration noise generated in the vehicle 12. The road noise is a noise generated by vibration of a floor or a body panel in the vehicle compartment due to vibration input from a road surface and transmitted to a vehicle body through tires and suspensions. If the road noise is significantly reduced, the vehicle compartment becomes more comfortable.

On the other hand, there are electric motors mounted on a recent vehicle 12 to be driven to change behaviors of the vehicle 12 to improve steering stability of the vehicle 12 and so on. There are several kinds of these electric motors such as the EPS motor 5 to provide a supplemental force for steering control, the RTC motor 7 to provide a supplemental force for controlling a toe angle of the rear wheels and the AS motor 9 to provide a supplemental force for controlling damping of the active suspension.

The inventors have acquired a knowledge of theses electric motors functioning as sensors (electric power generators) to detect a behavior change of the vehicle 12 through their investigation. In addition, there has been a knowledge that a vibration noise is generated by the behavior change of the vehicle 12.

Then, the inventors have conceived the active vibration control system 11 of a first aspect of the present invention which makes use of an electric motor to change a behavior of the vehicle 12 as an electric power generator and utilizes information on the inverse electromotive force induced on the electric motor as the reference signal.

The active vibration noise control system 11 of the first aspect includes the inverse electromotive force information receiving section to receive information on the inverse electromotive force induced on the electric motor by the vibration noise and enables receiving appropriate reference signals through the inverse electromotive force information receiving section without vibration sensors mounted for the reference signals, in contrast to the system having vibration sensors mounted respectively on suspensions and using vibration received from the vibration sensor of each wheel as the reference signal. As a result, the active vibration noise control system 11 of the first aspect enables simplifying the configuration for receiving the reference signal.

Figure 6:
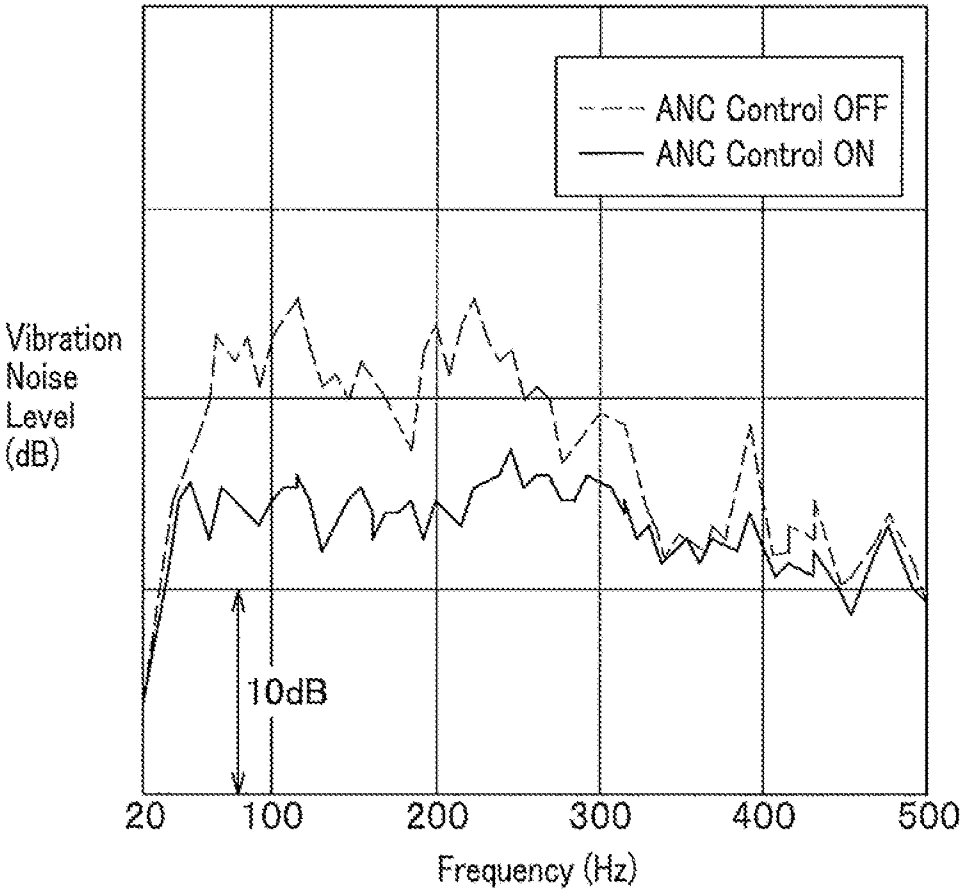
FIG. 6 is an illustration graph illustrating vibration noise levels measured on various frequency components of a vibration noise with ANC control turned on in comparison with vibration levels measured on various frequency components of a vibration noise with ANC control turned off.

An effect to reduce the vibration noise by the ANC control with the active vibration noise control system 11 of the present invention being in operation is shown. FIG. 6 is an illustration graph illustrating vibration noise levels measured on various frequency components of a vibration noise with ANC control turned on in comparison with vibration noise levels measured on various frequency components of a vibration noise with ANC control turned off. As seen in FIG. 6, it turns out that the vibration noise levels lower significantly in a frequency band between 50 Hz and 300 Hz when the ANC control of the active vibration noise control system 11 of the present invention is turned on.

The active vibration noise control system 11 of a second aspect is the active vibration noise control system 11 being in accordance with the first aspect and including one of or a combination of two or more of the electric motors of the EPS motor 5 to provide a supplemental force for steering control, the RTC motor 7 to provide a supplemental force for controlling a toe angle of the rear wheels and the AS motor 9 to provide a supplemental force for controlling damping of the active suspension If the RTC motor 7 is used as the electric motor instead, the active vibration noise control system 11 may use the RTC motor 7 for changing a behavior of the vehicle 12 as an electric generator in the same way as using the EPS motor 5 as an electric power generator and utilize information on the inverse electromotive force induced on the RTC motor 7 by the behavior change of the vehicle 12.

In addition, if the AS motor 9 is used as the electric motor instead, the active vibration noise control system 11 may use the AS motor 9 for changing a behavior of the vehicle 12 as an electric power generator in the same way as using the EPS motor 5 as an electric generator and utilize information on the inverse electromotive force induced on the AS motor 9 by the behavior change of the vehicle 12.

Since the active vibration noise control system 11 uses one of or a combination of two or more of the EPS motor 5, the RTC motor 7 and the AS motor 9 as the electric motor to change the behaviors of the vehicle 12, the information on the inverse electromotive forces induced on these electric motors may be used as the reference signals.

The active vibration noise control system 11 of a third aspect is the active vibration noise control system 11 being in accordance with the first aspect or the second aspect, further including the EPS processor (operation amount receiving section) 71 to receive information on the target operation amount to the EPS motor 5 and the actual operation amount of the EPS motor 5 and having the inverse electromotive force information receiving section 77 calculate a difference between the target operation amount to the EPS motor 5 that are received by the EPS processor 71 and the actual operation amount of the EPS motor 5 that are received by the EPS processor 71 and obtain the difference as the inverse electromotive force induced on the EPS motor 5.

The active vibration noise control system 11 of the third aspect provides an effect of simplifying a configuration to receive the reference signal without blocking the supplemental steering operation by the EPS motor 5.

The active vibration noise control system 11 of a fourth aspect is the active vibration noise control system 11 being in accordance with the third aspect and having the ANC processor (vibration noise control section) 78 use as the reference signal the information on the inverse electromotive force induced on the EPS motor 5 by the vibration noise when the EPS motor 5 is out of operation.

When the EPS motor 5 is in operation, there is usually a difference between the target operation amount to the EPS motor 5 and the actual operation amount of the EPS motor 5. Therefore, there could be a risk that the reference signal includes an error as a result of receiving a reference signal including an inverse electromotive force that cannot have been induced on the EPS motor 5, if the difference between the target operation amount and the actual operation amount is received as the information for the inverse electromotive force induced on the EPS motor 5.

Accordingly, the active vibration noise control system 11 of the fourth aspect makes use of the information on the inverse electromotive force induced by the vibration noise on the EPS motor 5 when the EPS motor 5 is out of operation. The active vibration noise control system 11 of the fourth aspect contributes to receiving a more accurate reference signal.

The active vibration noise control system 11 of a fifth aspect is the active vibration noise control system 11 being in accordance with any one of the first to fourth aspects, having the inverse electromotive force information receiving section 77 include the inversely induced current protection circuit 87 to which the inversely induced current induced to pass through the EPS motor (electric motor) 5 is input, and receive the information on the inverse electromotive force induced on the EPS motor 5 through the inversely induced current protection circuit 87.

The inverse electromotive force information receiving section 77 comprises various electrical components including a processor, in actuality. If the inversely induced current induced to pass through the EPS motor 5 passes through the electrical components such as the processor, these electrical components could be damaged. Therefore, the active vibration noise control system 11 of the fifth aspect have the inverse electromotive force information receiving section 77 receive the information on the inverse electromotive force induced on the EPS motor 5 through the inversely induced current protection circuit 87.

The active vibration noise control system 11 of the fifth aspect enables receiving the information on the inverse electromotive force induced on the EPS motor 5, for example, without having the electrical components such as the processor damaged.

Other Embodiments

The embodiments as have been described are specific examples of the present invention. Accordingly, the scope of the present invention should not be restricted by these embodiments. It should be noted that the present invention can be modified without deviating from the scope of the present invention and practiced appropriately.

For example, the EPS motor 5, which is an example of the electric motor, is described as a brushless DC motor in the description of the embodiment of the present invention. The electrical motor for the embodiment may be any one of a DC motor with a brush, an AC motor and a stepping motor.

In addition, the EPS motor 5 is described as a brushless DC motor including a permanent magnet rotor and stator coils thereinside in the embodiment of the present invention. However, the present invention should not be limited to this example. If the EPS motor 5 of a DC motor with a brush is used for the electric motor, the DC motor with a brush may comprise a rotor of coils and stators of permanent magnets. In addition, an electromagnet may be used instead of the permanent magnet.

DESCRIPTION OF SIGNS

5 EPS motor (Electric motor)
7 RTC motor (Electric motor)
9 AS motor (Electric motor)
11 Active vibration noise control system
12 Vehicle

71 EPS processor (Operation amount information receiving section)

77 Inverse electromotive force information receiving section

78 ANC processor (Error signal receiving section, vibration noise control section)

87 Inversely induced current protection circuit

What is claimed is:

1. An active vibration noise control system configured to be applied to a vehicle fitted with an electric motor to be driven to change a behavior of the vehicle and to actively control vibration noise generated in the vehicle, the active vibration noise control system comprising;

an error signal receiving section receiving acoustic information at a predetermined position in a vehicle compartment of the vehicle as an error signal;

a vibration noise control section controlling the vibration noise based on a reference signal correlating with the vibration noise and the error signal received by the error signal receiving section; and an inverse electromotive force information receiving section receiving information on an inverse electromotive force induced on the electric motor by a behavior change of the vehicle, wherein the electric motor is constituted by one of or a combination of two or more of an Electric Power Steering (EPS) motor generating a supplemental force for steering control, a Power Toe Control (RTC) motor generating a supplemental force for controlling a toe angle of rear wheels and an Active Suspension (AS) motor generating a supplemental force for damping control of an active suspension, and wherein the vibration noise control section makes use of the information on the inverse electromotive force, received by the inverse electromotive force information receiving section, as the reference signal.

2. The active vibration noise control system as claimed in claim 1, further comprising an operation amount information receiving section receiving information on a target operation amount to the electric motor and an actual operation amount of the electric motor, wherein the inverse electromotive force information receiving section is configured to calculate a difference between the target operation amount to the electric motor and the actual operation amount of the electric motor which are received by the operation amount information receiving section and obtain the difference that is calculated as information on the inverse electromotive force induced on the electric motor.

3. The active vibration noise control system as claimed in claim 2, wherein the vibration noise control section makes use of information on an inverse electromotive force induced on the electric motor by the vibration noise when the electric motor is not in operation as the reference signal.

4. The active vibration noise control system as claimed in claim 3, wherein the inverse electromotive force information receiving section includes an inversely induced current protection circuit to which an inversely induced current induced to pass through the electric motor is input, and receives information on an inverse electromotive force through the inversely induced current protection circuit.

5. The active vibration noise control system as claimed in claim 2, wherein the inverse electromotive force information receiving section includes an inversely induced current protection circuit to which an inversely induced current induced to pass through the electric motor is input, and receives information on an inverse electromotive force through the inversely induced current protection circuit.

6. The active vibration noise control system as claimed in claim 1, wherein the inverse electromotive force information receiving section includes an inversely induced current protection circuit to which an inversely induced current induced to pass through the electric motor is input, and receives information on an inverse electromotive force through the inversely induced current protection circuit.

* * * * *